US012661995B2

(12) United States Patent
 Gu

(10) Patent No.: US 12,661,995 B2
(45) Date of Patent: Jun. 23, 2026

(54) BRAKING CONTROL METHOD AND SYSTEM, VEHICLE, STORAGE MEDIUM AND CHIP

(71) Applicant: Xiaomi EV Technology Co., Ltd., Beijing (CN)

(72) Inventor: Wenhao Gu, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 44 days.

(21) Appl. No.: 18/428,384

(22) Filed: Jan. 31, 2024

(65) Prior Publication Data
 US 2024/0326603 A1      Oct. 3, 2024

(30) Foreign Application Priority Data

Mar. 30, 2023    (CN) .......................... 202310333582.4

(51) Int. Cl.
 B60L 7/18        (2006.01)
 B60L 7/26        (2006.01)
(52) U.S. Cl.
 CPC . B60L 7/26 (2013.01); B60L 7/18 (2013.01); B60L 2240/12 (2013.01);
 (Continued)
(58) Field of Classification Search
 CPC .......... B60L 7/18; B60L 7/26; B60L 15/2009; B60L 2220/46; B60L 2240/12; B60L 2240/22; B60L 2240/423; B60L 2240/465; B60T 13/741; B60T 8/171; B60T 8/172; B60T 2230/02; B60T 2270/604
 See application file for complete search history.

(56) References Cited

U.S. PATENT DOCUMENTS

| 10,543,818 B2 * | 1/2020 | Lian | ...................... | B60W 30/04 |
| 10,723,227 B2 * | 7/2020 | Lian | ................... | B60L 15/2009 |

(Continued)

FOREIGN PATENT DOCUMENTS

| CN | 104590051 A | 5/2015 |
| CN | 207328423 U | 5/2018 |

(Continued)

OTHER PUBLICATIONS

Extended European Search Report issued on Jul. 3, 2024 for European Patent Application No. 24155802.2.

*Primary Examiner* — Gonzalo Laguarda
(74) *Attorney, Agent, or Firm* — Volpe Koenig

(57) ABSTRACT

A braking control method, the method can be applied to a central control unit of a vehicle, the vehicle is a four-wheeled vehicle, two front wheels of the vehicle are each provided with a rim braking unit and a braking motor, each rim braking unit is configured to receive a control instruction of the central control unit to control the corresponding braking motor, and the method includes: adjusting, in response to a braking state update instruction, the braking state(s) of the braking motor and/or a target drive motor according to the braking state update instruction; where the target drive motor comprises at least one of a front axle motor and a rear axle motor; and the braking state update instruction includes at least one of a braking instruction, a vehicle tracking control triggering instruction, and a vehicle dynamic control triggering instruction.

17 Claims, 5 Drawing Sheets

(52) U.S. Cl.
CPC ..... *B60L 2240/22* (2013.01); *B60L 2240/423*
(2013.01); *B60L 2240/465* (2013.01)

(56) References Cited

U.S. PATENT DOCUMENTS

| | | | | |
|---|---|---|---|---|
| 10,737,679 | B2 * | 8/2020 | Frait | ..................... B60W 10/08 |
| 2009/0005939 | A1 | 1/2009 | Dueckinghaus et al. | |
| 2024/0198987 | A1 * | 6/2024 | Jiajun | ................. B60L 15/2009 |

FOREIGN PATENT DOCUMENTS

| | | | |
|---|---|---|---|
| CN | 108237950 | A | 7/2018 |
| CN | 111823881 | A | 10/2020 |
| CN | 112752691 | A | 5/2021 |
| CN | 113439046 | A | 9/2021 |
| CN | 113459817 | A | 10/2021 |
| CN | 114475276 | A | 5/2022 |
| CN | 115195492 | A | 10/2022 |
| EP | 3334619 | B1 | 3/2021 |
| EP | 3348444 | B1 | 4/2021 |
| EP | 3898357 | B1 | 9/2022 |
| EP | 3898359 | B1 | 2/2023 |
| JP | 2018188033 | A | 11/2018 |

* cited by examiner adjust, in response to a braking state update instruction, the braking state(s) of a braking motor and/or a target drive motor according to the braking state update instruction

BRAKING CONTROL METHOD AND SYSTEM, VEHICLE, STORAGE MEDIUM AND CHIP

CROSS REFERENCE TO RELATED APPLICATION

The present application claims the benefit of priority to Chinese Application No. 202310333582.4, filed on Mar. 30, 2023, the contents of which are incorporated herein by reference in their entireties for all purposes.

BACKGROUND OF THE INVENTION

In the related art, Electro Hydraulic Brake (EHB) is currently the main braking mode. Electro Mechanical Brake (EMB) is gradually replacing the braking mode of EHB due to its advantages of simple structure and fast response speed.

However, in the case where the EMB is adopted, how to control the braking to ensure driving safety is still an urgent problem to be solved.

SUMMARY OF THE INVENTION

The disclosure relates to the field of vehicle control, and in particular to a braking control method, device, and system, a vehicle, a medium and a chip.

According to a first aspect of examples of the disclosure, a braking control method is provided, the method is applied to a vehicle, the vehicle is a four-wheeled vehicle, two front wheels of the vehicle are each correspondingly provided with a rim braking unit and a braking motor, each rim braking unit is configured to receive a control instruction of a central control unit to control the corresponding braking motor, and the method includes: adjusting, in response to a braking state update instruction, the braking state(s) of the braking motor and/or a target drive motor according to the braking state update instruction; where the target drive motor comprises at least one of a front axle motor and a rear axle motor; and the braking state update instruction includes at least one of a braking instruction, a vehicle tracking control triggering instruction, and a vehicle dynamic control triggering instruction.

According to a second aspect of the examples of the disclosure, a braking control system is provided, the braking control system is arranged in a vehicle, the vehicle is a four-wheeled vehicle, the braking control system includes a central control unit, rim braking units, braking motors, a front axle motor and a rear axle motor; two front wheels of the vehicle are each correspondingly provided with the rim braking unit and the braking motor, each rim braking unit is configured to receive a control instruction from the central control unit to control the corresponding braking motor, and the central control unit is configured to: adjust, in response to a braking state update instruction, the braking state(s) of the braking motor and/or the target drive motor according to the braking state update instruction; where the target drive motor comprises at least one of the front axle motor and the rear axle motor; and the braking state update instruction includes at least one of a braking instruction, a vehicle tracking control triggering instruction, and a vehicle dynamic control triggering instruction.

According to a third aspect of the examples of the disclosure, a vehicle is provided, including: a processor; and a memory for storing processor-executable instructions; where the processor is configured to: adjust, in response to a braking state update instruction, the braking state(s) of a braking motor and/or a target drive motor according to the braking state update instruction; where the target drive motor comprises at least one of a front axle motor and a rear axle motor; and the braking state update instruction includes at least one of a braking instruction, a vehicle tracking control triggering instruction, and a vehicle dynamic control triggering instruction.

According to a fourth aspect of the examples of the disclosure, there is provided a non-transitory computer-readable storage medium having computer program instructions stored, the program instructions, when executed by a processor, implement the steps of the method according to any one of the first aspect of the disclosure.

According to a fifth aspect of the examples of the disclosure, there is provided a chip, including a processor and an interface; the processor is configured to read instructions to implement the method according to any one of the first aspect of the disclosure.

It is understood that the above general description and the following detailed description are illustrative and explanatory only and are not intended to limit the disclosure.

BRIEF DESCRIPTION OF DRAWINGS

The accompanying drawings, which are incorporated in and constitute a part of this specification, illustrate examples consistent with the disclosure and together with the description, serve to explain the principles of the disclosure.

FIG. 1 is a flowchart of a braking control method according to an example.

DETAILED DESCRIPTION OF THE INVENTION

Figure 2:
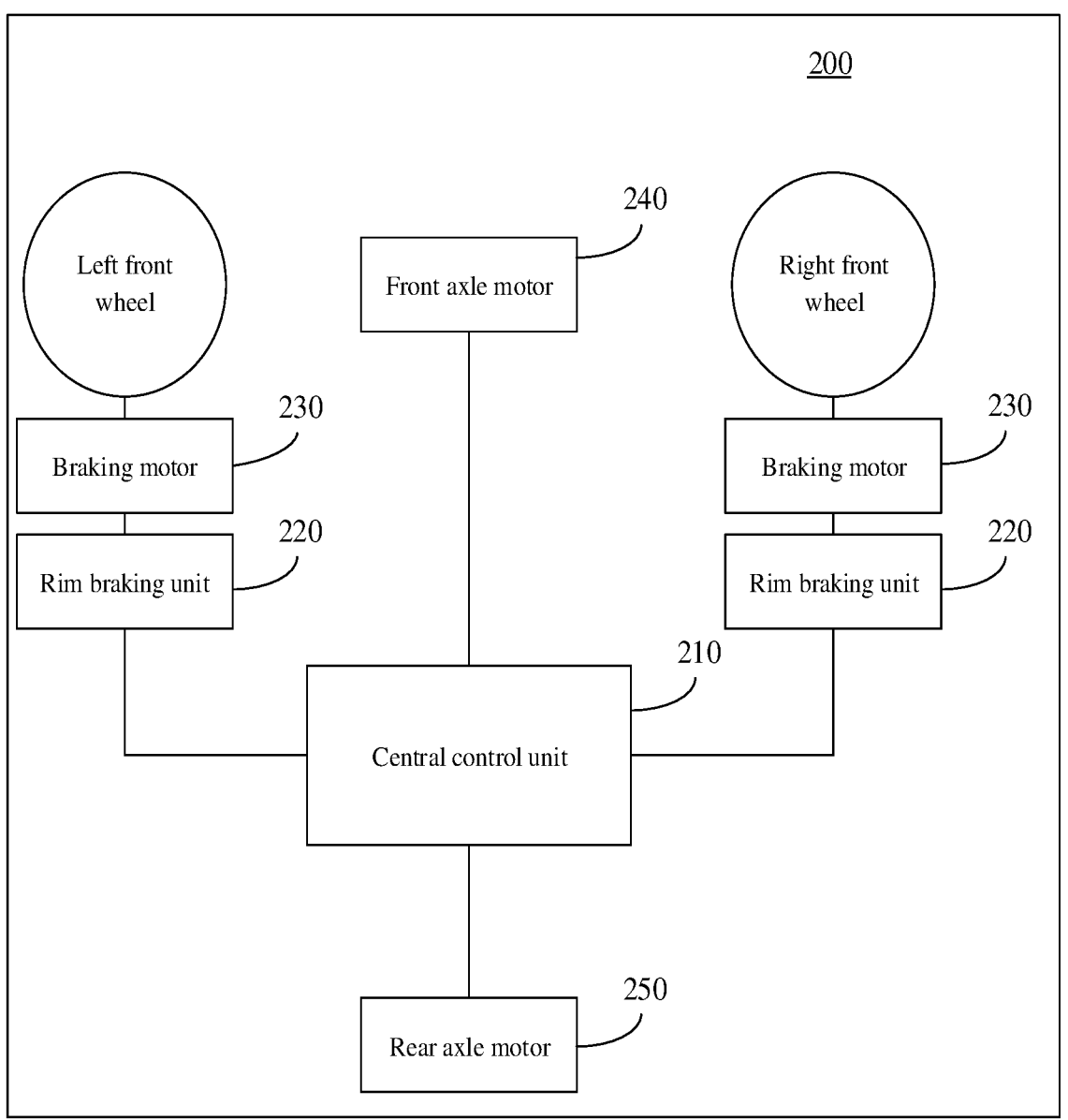
FIG. 2 is a schematic diagram of a braking control system according to an example.

Reference will now be made in detail to examples, instances of which are illustrated in the accompanying drawings. When the following description refers to the drawings, unless otherwise indicated, the same numbers in different drawings refer to the same or similar elements. The embodiments described in the following examples do not represent all embodiments consistent with the disclosure. Rather, they are merely examples of devices and methods consistent with some aspects of the disclosure as detailed in the appended claims.

Figure 1:
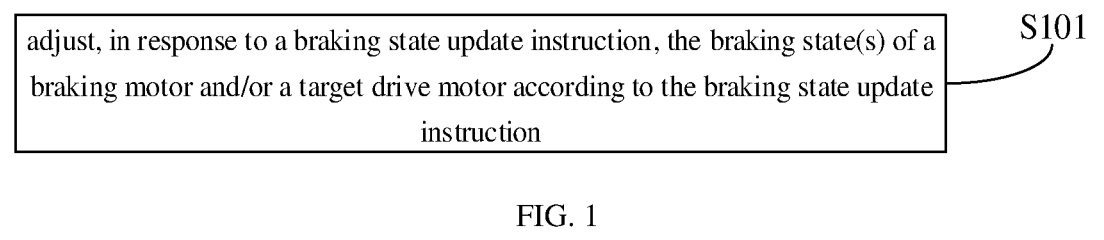

FIG. 1 is a flowchart of a braking control method according to an example, which may be applied to a central control unit of a vehicle. The central control unit may be, for example, a domain controller of the vehicle, which may be, for example, a domain controller of a vehicle intelligent driving domain, which may be a multi-core system-on-chip. The vehicle is a four-wheeled vehicle, the vehicle may be an electrically driven vehicle, two front wheels of the vehicle are each correspondingly provided with a rim braking unit and a braking motor. Each rim braking unit is configured to receive a control instruction from the central control unit to control a corresponding braking motor. The rim braking unit may be an ECU (Electronic Control Unit) connected to the central control unit through a CAN bus. As shown in FIG. 1, the method includes step S101.

In S101, in response to a braking state update instruction, the braking state(s) of the braking motor and/or a target drive motor are/is adjusted according to the braking state update instruction.

The target drive motor comprises at least one of a front axle motor and a rear axle motor. The braking state update instruction includes at least one of a braking instruction, a vehicle tracking control triggering instruction, and a vehicle dynamic control triggering instruction.

In some examples, the rim braking unit is further connected with a parking mechanism, and the rim braking unit is further configured to control the parking mechanism. The parking mechanism includes a parking ratchet pawl, a reduction gear, and a parking solenoid valve or a parking motor.

The rim braking unit and the braking motor may constitute an electro-mechanical braking-by-wire device, and the rim braking unit can control the corresponding braking motor by pure wire control. The electro-mechanical braking-by-wire eliminates a complicated hydraulic line, and the braking motor of the wheel end is controlled by pure wire control to generate a braking force to achieve braking, so that the braking system of the vehicle has advantages of simple structure and fast response speed. In addition, the two front wheels may be respectively provided with a wheel speed sensor, and the wheel speed of the corresponding wheel acquired by the wheel speed sensor may be acquired by the rim braking unit and transmitted to the central control unit via the CAN bus.

The rear axle motor is a driving motor for driving two rear wheels, the front axle motor is a driving motor for driving two front wheels, and the rear axle motor and the front axle motor may be directly connected to the central control unit, such as through Ethernet, and directly receive control signals from the central control unit.

Further, the braking instruction and the parking instruction may be instructions transmitted based on an operation of the driver, such as pedaling a braking pedal, or when the vehicle is placed in park "P" mode such as by pressing a P-gear button, the braking instruction may be transmitted. The vehicle dynamic control triggering instruction may be transmitted if the vehicle detects instability. The vehicle tracking control triggering instruction may be transmitted if the vehicle detects driving wheel slippage. When the vehicle is driven by the front axle motor, then the driving wheels are two front wheels. When the vehicle is driven is driven by the rear axle is driven, then the driving wheels are two rear wheels. Additionally, when the vehicle is driven simultaneously by the front axle motor and the rear axle motor, then the driving wheels are four wheels of the vehicle.

In some embodiments, the adjustment of the braking state of the braking motor may be achieved in particular through the rim braking unit by receiving a control instruction from the central control unit. Adjusting the braking state of the braking motor may include controlling any one or more of the plurality of braking motors to start generating a braking force, or to stop generating a braking force, or to adjust the magnitude of braking force generated by any one or more of the braking motors. The adjustment of the braking state of the target drive motor may in particular be achieved by direct control of the target drive motor by the central control unit. Adjusting the braking state of the target drive motor may include controlling the target drive motor to stop or start generating a negative torque to provide the braking force, or adjusting the magnitude of the torque generated by the target drive motor.

The negative torque generated by the rear axle motor through the kinetic energy recovery can generate a whole vehicle deceleration of 0.3 g-0.5 g, the requirement for normal driving can be reliably met in combination with the deceleration provided by the braking forces generated by the braking motors of the two front wheels, and g is the gravitational acceleration.

In an example of the disclosure, by providing the rim braking units and the braking motors on the two front wheels of the vehicle, and by controlling the braking state of the driving motor and/or controlling the braking state of the braking motor by the rim braking unit, it is possible to realize effective braking under different braking state update instructions and guarantee safety performance of driving. Further, by disposing the corresponding rim braking units and the braking motors only at the two front wheels, it is possible to effectively reduce the cost of the vehicle.

In some optional examples, the rear axle motor includes a first rear axle motor corresponding to a left rear wheel and a second rear axle motor corresponding to a right rear wheel, and the target drive motor comprises at least one of the front axle motor, the first rear axle motor, and the second rear axle motor. Further, a vehicle with two rear axle motors and a front axle motor may be referred to as a three-motor vehicle. It is worth noting that after the EMB development and the three-motor development have matured, the EMB mechanical braking of the rear axle will have to be completely replaced by three motors, thus saving a lot of whole vehicle cost. Once this form has been adopted, how to form an effective and safe braking force under various working conditions becomes a big challenge. In examples of the disclosure, the braking safety performance of such a vehicle may be ensured based on the following optional embodiments.

It is appreciated that, in a case where only one rear axle motor is arranged, and only two braking motors corresponding to the front wheels are reserved and the braking motor of the rear axle is canceled, only the rear axle motor is used for braking. When the vehicle has special conditions, such as sideslip drift, the single rear axle motor can only drive two wheels of the rear axle to brake at the same time, and cannot brake a single rear wheel. Thus, it cannot make up for the yaw velocity generated during drift of the whole vehicle, and it is difficult to realize the stability of the vehicle body.

By adopting the solution, the first rear axle motor corresponding to the left rear wheel and the second rear axle motor corresponding to the right rear wheel are arranged, so that each rear wheel can be reliably braked under special conditions of the vehicle, thus ensuring the driving safety of the vehicle.

In further examples, the rim braking unit and the braking motor are also provided for each of the two rear wheels of the vehicle.

Although the cost can be effectively reduced by correspondingly arranging the rim braking units and the braking motors to the two front wheels, it may lead to the problem of insufficient lateral stability of the vehicle when the rear axle adopts a single motor. Thus, by adopting the above solution, the wheel braking units and the braking motors are respectively arranged on the two rear wheels, and the braking force is provided by the braking motors of the rear wheels to meet the braking requirement of the vehicle.

Those skilled in the art can determine a specific configuration of braking equipment of the vehicle based on the combined consideration of safety performance and vehicle cost, and the disclosure does not limit this specifically.

For example, it is possible to arrange only the rim braking units and the braking motors for the two front wheels, respectively, and to arrange only one front axle motor and one rear axle motor. As another example, it is possible to arrange only the rim braking units and the braking motors for the two front wheels, respectively, and to arrange one front axle motor and two rear axle motors. As another example, it is possible to arrange the rim braking units and braking motors for four wheels, respectively, and to arrange one front axle motor and two rear axle motors. Optionally, it is also possible to arrange the rim braking units and the braking motors for the four wheels, respectively, and to arrange one front axle motor and one rear axle motor.

In some optional examples, the step that, in response to the braking state update instruction, the braking state(s) of the braking motor and/or the target drive motor are/is adjusted according to the braking state update instruction includes: in response to the braking instruction, in a case where a required braking force to which the braking instruction corresponds is determined to be greater than a preset threshold, two braking motors to which the two front wheels respectively correspond are preferentially controlled to generate braking forces to satisfy the required braking force; and in a case where braking forces generated by the two braking motors fail to satisfy the required braking force, the rear axle motor is controlled to generate a negative torque to complement the required braking force.

The required braking force to which the braking instruction corresponds may be determined based on the depth of a braking pedal, or the depth of a P-gear button. For example, in a case where a braking pedal failure is determined, a required braking force may be determined based on the depth of the P-gear button and a braking instruction may be generated according to the required braking force and transmitted to the central control unit, and the required braking force may be proportional to the depth of the P-gear button.

In addition, the preset threshold may be calibrated according to actual conditions, and may be, for example, a braking force corresponding to 0.8 g of the deceleration, which is not particularly limited by the disclosure.

With this solution, when the required braking force is greater than the preset threshold, the braking force can be preferentially provided by the two braking motors corresponding to the two front wheels to realize the front axle braking, and the required braking force is complemented by the rear axle motor, the stability when the vehicle is braked can be effectively guaranteed. Thus, the braking safety performance is provided.

In some optional examples, the step that, in response to the braking state update instruction, the braking state(s) of the braking motor and/or the target drive motor are/is adjusted according to the braking state update instruction, further includes: in response to the braking instruction, in a case where the required braking force to which the braking instruction corresponds is determined to be smaller than a preset threshold, according to an ideal braking force distribution curve, a first braking force and a second braking force are determined, a sum of the first braking force and the second braking force being equal to the required braking force; two braking motors respectively corresponding to the two front wheels are controlled to generate the first braking force; and the rear axle motor is controlled to generate the second braking force.

The ideal braking force distribution curve may be pre-calibrated by bench testing or simulation testing and stored in a storage device of the vehicle. Upon determining that the required braking force is smaller than the preset threshold, the central control unit may obtain the ideal braking force distribution curve by accessing the storage device and determine the magnitude of the braking forces distributed to the front axle and the rear axle, that is, the magnitude of the first braking force and the second braking force, according to the required braking force.

In addition, the braking forces distributed to the braking motors to which the two front wheels correspond respectively, or the rear axle motors to which the two rear wheels correspond respectively, may be the same or different in magnitude, and the disclosure is not limited to this. In some possible embodiments, the magnitude of braking force allocated by each braking motor and each driving motor may be determined based on a four wheel slip rate.

Further, in other optional examples, after controlling the vehicle in response to the braking instruction, the anti-lock control may be further performed in response to an anti-lock control triggering instruction. The anti-lock control instruction may be transmitted if the vehicle detects wheel lock due to emergency braking.

For example, after the control corresponding to the above-described braking instruction is performed, if the vehicle detects that one or more wheels are locked, the anti-lock control triggering instruction may be transmitted so that the central control unit determines the reference speed of the vehicle and the four-wheel slip rate according to the wheel speed information of the respective wheels, and adjusts the braking states of the respective braking motors and the respective drive motors according to the reference speed of the vehicle and the four-wheel slip rate to implement anti-lock control. The safety performance of vehicle braking is further improved.

In some optional examples, the step that, in response to the braking state update instruction, the braking state(s) of the braking motor and/or the target drive motor are/is adjusted according to the braking state update instruction, further includes: in response to the vehicle tracking control triggering instruction, a reference speed of the vehicle and a four-wheel slip rate are determined according to wheel speeds of the two front wheels and axle speeds of the first rear axle motor and the second rear axle motor; and according to the reference speed of the vehicle and the four-wheel slip rate, braking forces generated by two braking motors respectively corresponding to the two front wheels are adjusted to suppress front wheel slippage, and/or the torque(s) generated by the first rear axle motor and/or the second rear axle motor are/is adjusted to suppress rear wheel slippage.

It is noted that, in this example, the vehicle includes two rear axle motors, also, the vehicle may be provided with corresponding wheel speed sensors on the two front wheels, respectively, and the corresponding rim braking units and braking motors, the rotational speeds of the two front wheels can be obtained by the corresponding rim braking units, each rim braking unit can be connected with the wheel speed sensor of the wheel to which the rim braking unit corresponds, and the wheel speed of the corresponding wheel can be detected by the wheel speed sensor.

In addition, the vehicle tracking control is a control manner for suppressing wheel slip in a case where a wheel slip of the vehicle occurs, which may also be referred to as traction control, and the disclosure is not limited to this.

For example, if the four-wheel slip rate indicates that a certain front wheel is slipping, the braking force may be increased by controlling the corresponding braking motor of the front wheel to limit the slippage of the front wheel, or, if a certain rear wheel is slipping, the output torque may be decreased by the corresponding rear axle motor to limit the slippage of the rear wheel.

By adopting the above solution, the wheel speeds of the two rear wheels can be determined by the axle speeds of the two rear axle motors only in the case where the two front wheels are respectively provided with corresponding rim braking units and braking motors, and the vehicle tracking control can be reliably realized based on the two rear axle motors and the braking motors corresponding to the two front wheels, thus effectively inhibiting wheel slippage and further improving the driving safety performance of the vehicle.

In some optional examples, the step that, in response to the braking state update instruction, the braking state(s) of the braking motor and/or the target drive motor are/is adjusted according to the braking state update instruction, further includes: in response to the vehicle dynamic control triggering instruction, a yaw angle of the vehicle is determined, and a reference speed of the vehicle and a four-wheel slip rate are determined according to wheel speeds of the two front wheels and axle speeds of the first rear axle motor and the second rear axle motor; a braking torque required for each wheel is determined based on the reference speed of the vehicle, the four-wheel slip rate, the yaw angle of the vehicle, and a target yaw velocity; and two braking motors respectively corresponding to the two front wheels are controlled to generate braking forces to satisfy braking torques respectively corresponding to the two front wheels, and the first rear axle motor and/or the second rear axle motor are/is controlled to generate the negative torque(s) to satisfy braking torques respectively corresponding to the two rear wheels.

It is noted that, in this example, the vehicle may include two rear axle motors, also, the vehicle may be provided with corresponding wheel speed sensors on the two front wheels, respectively, and the corresponding rim braking units and braking motors, the rotational speeds of the two front wheels can be obtained by the corresponding rim braking units, each rim braking unit can be connected with a wheel speed sensor of the wheel to which the rim braking unit corresponds, and the wheel speed of the corresponding wheel can be detected by the wheel speed sensor.

It is appreciated that when the vehicle is steered, it is inevitable to experience lateral and longitudinal forces, and the driver can control the vehicle only when the ground is able to provide sufficient lateral and longitudinal forces. If the lateral attachment ability of the ground surface is low, the ability of the vehicle to travel in a predetermined direction may be impaired, resulting in instability.

The vehicle dynamic control triggering instruction may be transmitted if the vehicle detects that instability occurs, for example, if the front wheels tend to slide out of the curve due to insufficient steering ability when the vehicle turns left, for example, the vehicle may sense that a sideslip is about to occur and send the vehicle dynamic control triggering instruction to cause the braking motor and/or the target drive motor to brake the left rear wheel and cause the vehicle to follow the desired path.

By adopting the above solution, the wheel speeds of the two rear wheels can be determined by the axle speeds of the two rear axle motors only in the case where the two front wheels are respectively provided with corresponding rim braking units and braking motors, and the vehicle dynamic control is reliably achieved, wheel instability can be effectively suppressed, and the driving safety performance of the vehicle is improved.

In other examples, the vehicle may further be provided with respective rim braking units, braking motors and wheel speed sensors at the two rear wheels and the two front wheels, the central control unit may then directly acquire the wheel speed acquired by the corresponding wheel speed sensor on the basis of the rim braking unit corresponding to each wheel to determine the wheel speed of each wheel, thus determining the total vehicle reference speed and the four-wheel slip rate, and perform vehicle tracking control or anti-lock control or vehicle dynamic control, etc. In this way, the wheel speed information obtained by the central control unit can be made more accurate, and thus more precise control can be achieved.

Optionally, in yet other examples, the vehicle may also include only one rear axle motor, corresponding rim braking units and braking motors are arranged at the two rear wheels respectively, and a wheel speed sensor is arranged corresponding to only one rear wheel, further based on the axle speed of the rear axle motor and the wheel speed acquired by the corresponding wheel speed sensor of the one rear wheel, the wheel speed of the other rear wheel is determined, thus determining a reference speed of the vehicle and the four-wheel slip rate, and performing vehicle tracking control or anti-lock control or vehicle dynamic control and the like. In this way, the cost of one wheel speed sensor can be saved.

Optionally, in yet other examples, it is also possible to arrange only one wheel speed sensor at one front wheel, and arrange two rear axle motors, further, based on the rotational speed of the front axle motor and the wheel speed acquired by the wheel speed sensor, the wheel speed corresponding to the other front wheel is determined, and, based on the axle speed of the rear axle motor, respective wheel speeds of the two rear wheels are determined, thus obtaining the wheel speed corresponding to each wheel, and determining the reference speed of the vehicle and the four-wheel slip rate, and performing vehicle tracking control or anti-lock control or vehicle dynamic control and the like. In this way, only one wheel speed sensor can be installed to determine the wheel speed corresponding to each wheel, thus saving the cost.

In some optional examples, the braking state update instruction further includes a parking instruction; the rim braking unit is further connected with a parking mechanism, the rim braking unit is further configured to control the parking mechanism, the parking mechanism includes a parking ratchet pawl, a reduction gear, and a parking solenoid valve or a parking motor; the step that, in response to the braking state update instruction, the braking state(s) of the braking motor and/or the target drive motor are/is adjusted according to the braking state update instruction, includes: in response to the parking instruction, a required parking braking force is determined based on vehicle weight and a hill angle; two braking motors corresponding to the front wheels are controlled to generate braking forces to satisfy the parking braking force; and the parking solenoid valve or the parking motor is controlled to clamp the parking ratchet pawl on the reduction gear to form a permanent parking force.

The braking motors respectively corresponding to the two front wheels can be provided with a solenoid-driven ratchet parking mechanism, and a parking function can be achieved by a parking solenoid valve or a parking motor to clamp the parking ratchet pawl on the reduction gear to form a permanent parking force.

By adopting the above solution, the braking force required for parking can be generated by the braking motor, and the permanent parking force is formed by the parking solenoid valve or the parking motor by clamping the parking ratchet pawl on the reduction gear, the permanent parking can be reliably realized by the braking motor, without separately providing the hydraulic braking system, thus effectively reducing the cost.

In some optional examples, the central control unit includes a main control unit and a redundant control unit, and the step that, in response to the braking state update instruction, the braking state(s) of the braking motor and/or the target drive motor are/is adjusted according to the braking state update instruction, includes: in a case where the main control unit is determined not to fail, the main control unit, in response to a braking state update instruction, adjusts the braking state(s) of the braking motor and/or the target-driving motor according to the braking state update instruction; and in a case where the main control unit fails and the redundant control unit does not fail, the redundant control unit, in response to the braking state update instruction, adjusts the braking state(s) of the braking motor and/or the target drive motor according to the braking state update instruction.

The main control unit and a standby control unit may be two cores in the central control unit, or may be two separate electronic devices, and the disclosure is not limited to this.

With the above solution, it is possible to perform the control of the braking motor and the driving motor to realize the adjustment of the braking state in a case where any one of the control units fails, and it is possible to effectively guarantee the safety performance of driving and braking of the vehicle.

Optionally, in response to the braking state update instruction, the braking state(s) of the braking motor and/or the target drive motor are/is adjusted according to the braking state update instruction includes: a failure condition of the rim braking unit is determined in response to the braking state update instruction; and the braking state(s) of the braking motor and/or the target drive motor are/is adjusted based on the failure condition and the braking state update instruction.

It is appreciated that if a particular rim braking unit fails, the central control unit cannot control the corresponding braking motor of the rim braking unit and cannot acquire the wheel speed information collected by the corresponding wheel speed sensor via the rim braking unit.

Accordingly, the braking state(s) of the braking motor and/or the target drive motor are/is adjusted according to the failure condition and the braking state update instruction, and in particular the braking state(s) of the braking motor and/or the target drive motor corresponding to the non-failed rim braking unit are/is adjusted. Further, the wheel speed information collected by the corresponding wheel speed sensor and the shaft speed of each drive motor can be acquired by the non-failed rim braking unit, and the wheel speed of the corresponding wheel can be acquired by the rim braking unit which is determined not to fail, thus more reliably implementing vehicle tracking control or anti-lock control or vehicle dynamic control and the like.

By adopting this solution, a failure condition of each rim braking unit is determined before performing the control and the corresponding braking motor and drive motor are controlled based on the failure condition and the braking state update instruction. Thereby effectively avoiding safety hazards caused by the presence of a failed rim braking unit, and effectively improving the safety performance of braking.

Based on the inventive concept as a whole, the disclosure also provides a schematic diagram of a braking control system according to an example as shown in FIG. 2. A braking control system 200 is provided in a vehicle and the vehicle is a four-wheeled vehicle. As shown in FIG. 2, the braking control system 200 includes a central control unit 210, rim braking units 220, braking motors 230, a front axle motor 240 and a rear axle motor 250. Each of the two front wheels of the vehicle is provided with a rim braking unit 220 and a braking motor 230, i.e., a left front wheel and a right front wheel as shown in FIG. 2, and each of the rim braking units 220 is configured to receive a control instruction from the central control unit 210 to control the corresponding braking motor 230. The central control unit 210 is configured to perform any one or more of the steps referred to in the included method examples, thus implementing at least one of braking control, vehicle tracking control, and/or vehicle dynamic control.

Figure 3:
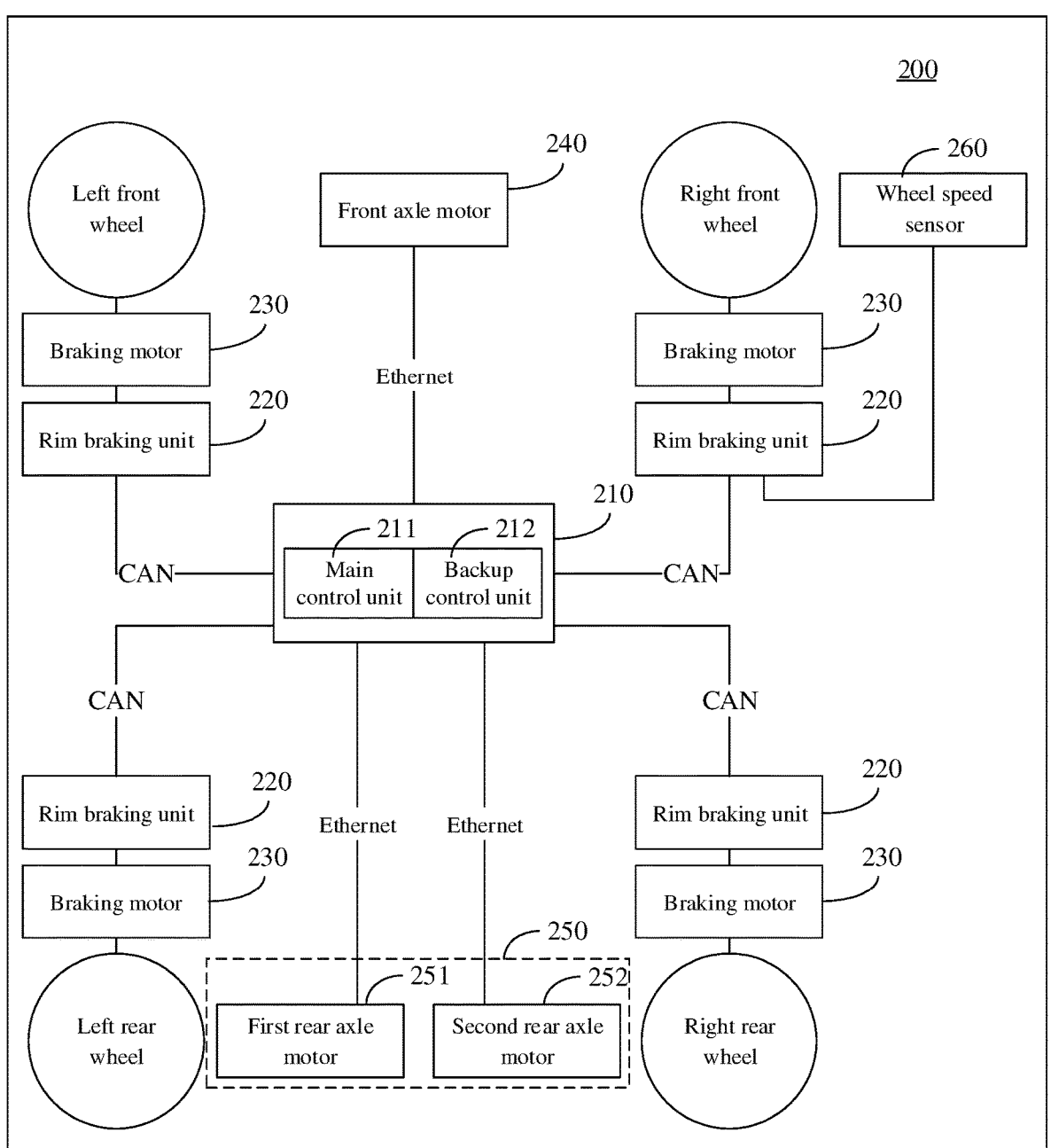
FIG. 3 is another schematic diagram of a braking control system according to an example.

Further, referring to FIG. 3, the rim braking unit 220 may be an ECU connected to the central control unit 210 through a CAN bus. FIG. 3 is a schematic diagram of the braking control system 200, as shown in FIG. 2, and further includes the two rear wheels of the vehicle, as well as additional details. Any portions of the braking control system 200 described with reference to FIG. 2 are not repeated, and have at least the same functions and capabilities, unless explicitly stated otherwise. The rear axle motor 250 is a driving motor for driving the two rear wheels, and the front axle motor 240 is a driving motor for driving two front wheels. The rear axle motor 250 and the front axle motor 240 may be directly connected to the central control unit 210, for example, through Ethernet, and directly receive a control signal from the central control unit 210.

In some examples, referring to FIG. 3, the rear axle motor 250 includes a first rear axle motor 251 corresponding to a left rear wheel and a second rear axle motor 252 corresponding to a right rear wheel, and the target drive motor (not shown) comprises at least one of the front axle motor 240, the first rear axle motor 251, and the second rear axle motor 252.

In other examples, referring to FIG. 3, the two rear wheels of the vehicle are each further provided with a rim braking unit 220 and a braking motor 230.

Further, a wheel speed sensor 260 may also be provided corresponding to at least one wheel, for example, referring to FIG. 3, only one wheel speed sensor 260 may be provided on the right front wheel, or, in some examples, a corresponding wheel speed sensor 260 may be provided on each wheel, and the wheel speed of the corresponding wheel collected by the corresponding wheel speed sensor 260 may be collected by the rim braking unit 220 and transmitted to the central control unit 210 via the CAN bus.

In some examples, the central control unit 210 may further include a main control unit 211 and a backup control unit 212, thus enabling effective control in the event of failure of either control unit.

In still other examples, the rim braking unit 220 may also be connected with a parking mechanism for controlling the parking mechanism, which may include a parking ratchet pawl, a reduction gear, and a parking solenoid valve or a parking motor. The central control unit 210 may be configured to determine the required parking braking force according to the vehicle weight and the hill angle in response to the parking instruction; control the two braking motors 230 corresponding to the front wheels to generate braking forces to satisfy the parking braking force; and, control the parking solenoid valve or the parking motor to clamp the parking ratchet pawl on the reduction gear to create a permanent parking force.

Figure 4:
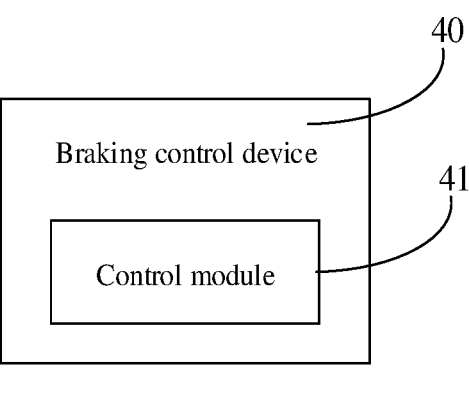
FIG. 4 is a schematic diagram of a braking control device according to an example.

FIG. 4 is a block diagram illustrating a braking control device according to an example the braking control device

40 may act as a central control unit 210 (of FIGS. 2 and/or 3) of the vehicle. The vehicle is a four-wheeled vehicle, two front wheels of the vehicle are each provided with a rim braking unit and a braking motor, each of the rim braking units being configured to receive a control instruction from the central control unit to control the corresponding braking motor. The braking control device 40 includes a control module 41.

The control module 41 is configured to, adjust, in response to a braking state update instruction, the braking state(s) of the braking motor, and/or a target driving motor according to the braking state update instruction. The target drive motor comprises at least one of a front axle motor and a rear axle motor. The braking state update instruction includes at least one of a braking instruction, a vehicle tracking control triggering instruction, and a vehicle dynamic control triggering instruction.

Optionally, the rear axle motor includes the first rear axle motor corresponding to the left rear wheel and the second rear axle motor corresponding to the right rear wheel, the target drive motor comprises at least one of the front axle motor, the first rear axle motor and the second rear axle motor; and/or each of the two rear wheels of the vehicle is further correspondingly provided with the rim braking unit and the braking motor.

Optionally, the control module 41 is configured to: in response to the braking instruction, in a case where a required braking force to which the braking instruction corresponds is determined to be greater than a preset threshold, preferentially control two braking motors to which the two front wheels respectively correspond to generate braking forces to satisfy the required braking force; and control the rear axle motor to generate a negative torque to complement the required braking force in a case where braking forces generated by the two braking motors fail to satisfy the required braking force.

Optionally, the control module 41 is configured to: in response to the braking instruction, in a case where a required braking force to which the braking instruction corresponds is determined to be smaller than a preset threshold, according to an ideal braking force distribution curve, determine a first braking force and a second braking force, a sum of the first braking force and the second braking force being equal to the required braking force; control two braking motors respectively corresponding to the two front wheels to generate the first braking force; and control the rear axle motor to generate the second braking force.

Optionally, the control module 41 is configured to: in response to the vehicle tracking control triggering instruction, determine a reference speed of the vehicle and a four-wheel slip rate according to wheel speeds of the two front wheels and axle speeds of the first rear axle motor and the second rear axle motor; and according to the reference speed of the vehicle and the four-wheel slip rate, adjust braking forces generated by two braking motors respectively corresponding to the two front wheels to suppress front wheel slippage, and/or adjust the torque(s) generated by the first rear axle motor and/or the second rear axle motor to suppress rear wheel slippage.

Optionally, the control module 41 is configured to: in response to the vehicle dynamic control triggering instruction, determine a yaw angle of the vehicle, and determine a reference speed of the vehicle and a four-wheel slip rate according to wheel speeds of the two front wheels and axle speeds of the first rear axle motor and the second rear axle motor; determine a braking torque required for each wheel based on the reference speed of the vehicle, the four-wheel slip rate, the yaw angle of the vehicle, and a target yaw velocity; and control two braking motors respectively corresponding to the two front wheels to generate braking forces to satisfy braking torques respectively corresponding to the two front wheels, and control the first rear axle motor and/or the second rear axle motor to generate the negative torque(s) to satisfy braking torques respectively corresponding to the two rear wheels.

Optionally, the braking state update instruction further includes a parking instruction; the rim braking unit is further connected with a parking mechanism, the rim braking unit is further configured to control the parking mechanism, the parking mechanism includes a parking ratchet pawl, a reduction gear, and a parking solenoid valve or a parking motor.

The control module 41 is configured to: in response to the parking instruction, determine a required parking braking force based on vehicle weight and a hill angle; control two braking motors corresponding to the front wheels to generate braking forces to satisfy the parking braking force; and control the parking solenoid valve or the parking motor to clamp the parking ratchet pawl on the reduction gear to form a permanent parking force.

Optionally, the central control unit includes a main control unit and a redundant control unit, optionally, the control module 41 is configured to: in a case where the main control unit is determined not to fail, adjust, by the main control unit in response to a braking state update instruction, the braking state(s) of the braking motor and/or a target-driving motor according to the braking state update instruction; in a case where the main control unit fails and the redundant control unit does not fail, adjust, by the redundant control unit, in response to the braking state update instruction, the braking state(s) of the braking motor and/or the target drive motor according to the braking state update instruction.

Optionally, the control module 41 is configured to: in response to the braking state update instruction, determine a failure condition of the rim braking unit; and adjust the braking state(s) of the braking motor and/or the target drive motor based on the failure condition and the braking state update instruction.

With respect to the braking control device 40 in the described examples, the specific manner in which the various modules perform operations has been described in detail in relation to the example of the method, and will not be described in detail here.

In addition to being a separate electronic device, the braking control device 40 may be a part of a separate electronic device. For example, in one example, the braking control device 40 may be an Integrated Circuit (IC) or a chip, the IC may be an IC or a collection of ICs. The chip may include, but is not limited to, the following categories: GPU (Graphics Processing Unit), CPU (Central Processing Unit), FPGA (Field Programmable Gate Array), DSP (Digital Signal Processor), ASIC (Application Specific Integrated Circuit), SOC (System on Chip or System on Chip), etc. The integrated circuit or chip described may be used to execute executable instructions (or code) to implement the braking control methods described herein. The executable instructions may be stored on the integrated circuit or chip or may be retrieved from another apparatus or device. For example, the integrated circuit or chip may include a processor, a memory, and an interface for communicating with another apparatus. The executable instructions may be stored in the memory, which when executed by the processor implement the braking control method described above; optionally, the integrated circuit or chip may receive executable instructions through the interface and transmit to the processor for execution to implement the braking control methods described herein.

The disclosure also provides a non-transitory computer readable storage medium having computer program instructions stored thereon, the program instructions implement the steps of the braking control methods provided by the disclosure when executed by a processor.

Figure 5:
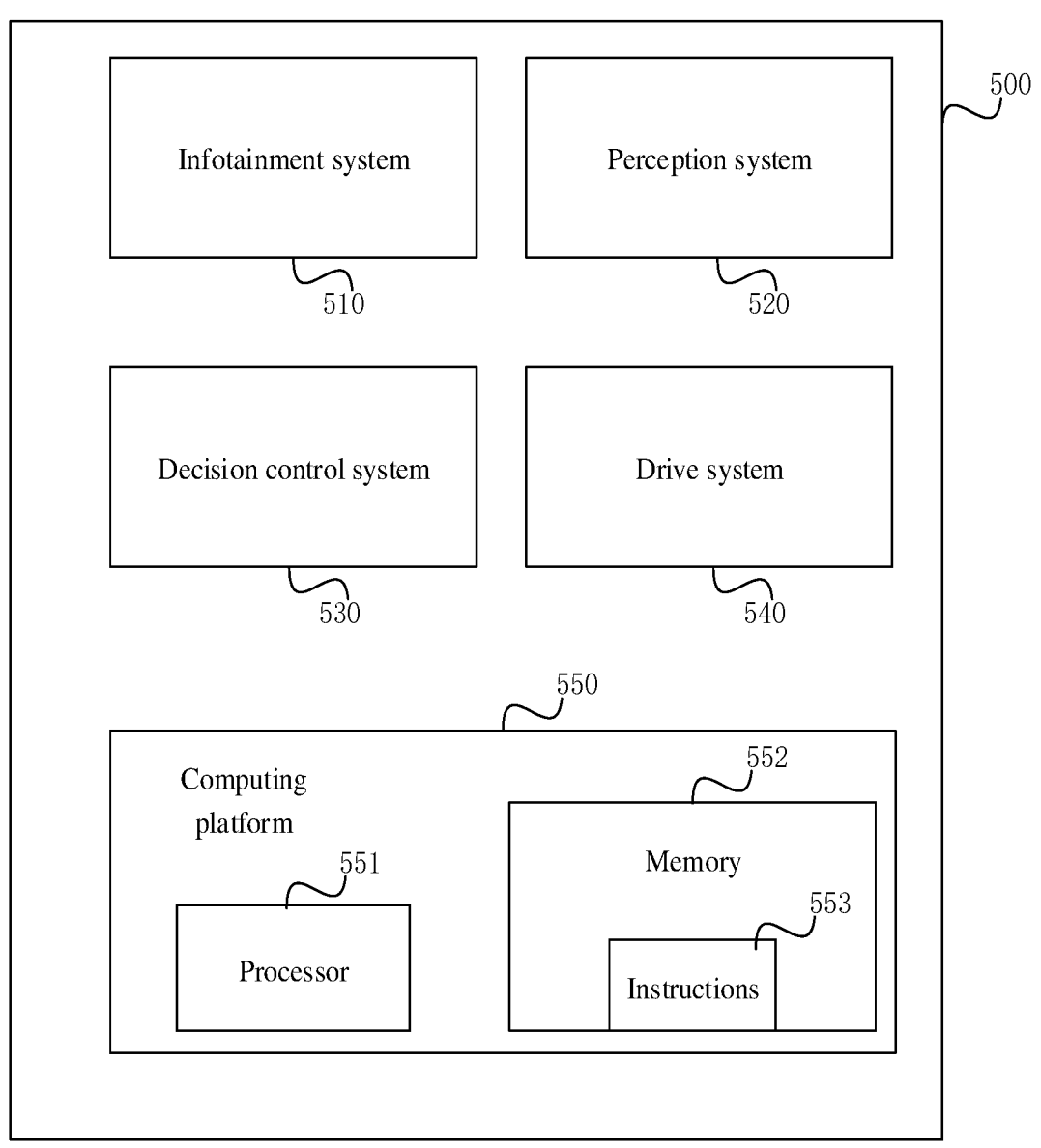
FIG. 5 is a functional block diagram of a vehicle according to an example.

FIG. 5 is a block diagram illustrating a vehicle 500 according to an example. For example, the vehicle 500 may be a hybrid vehicle or a non-hybrid vehicle, an electric vehicle, a fuel cell vehicle, or another type of vehicle. The vehicle 500 may be an autonomous vehicle, a semi-autonomous vehicle, or a non-autonomous vehicle.

Referring to FIG. 5, the vehicle 500 may include various subsystems, such as an infotainment system 510, a perception system 520, a decision control system 530, a drive system 540, and a computing platform 550 communicatively connected to each other. The vehicle 500 may also include more or fewer subsystems, and each subsystem may include a plurality of components. In addition, interconnections between subsystems and between components of the vehicle 500 may be implemented by wired or wireless means.

In some examples, the infotainment system 510 may include a communication system, an entertainment system, a navigation system, and the like.

The perception system 520 may include a number of sensors for sensing information of the environment surrounding the vehicle 500. For example, the perception system 520 may include a global positioning system (which may be a GPS system or a Beidou system or other positioning system), an inertial measurement unit (IMU), a lidar, a millimeter wave radar, an ultrasonic radar, and a camera.

The decision control system 530 may include a computing system, a whole vehicle controller, a steering system, a throttle, and a braking system.

The drive system 540 may include components that provide powered motion for the vehicle 500. In one example, the drive system 540 may include an engine, an energy source, a transmission system, and wheels. The engine may be one or a combination of an internal combustion engine, an electric motor, an air compression engine. The engine is capable of converting energy provided by the energy source into mechanical energy.

Some or all of the functions of the vehicle 500 are controlled by the computing platform 550. The computing platform 550 may include at least one processor 551 and a memory 552, and the processor 551 may execute instructions 553 stored in the memory 552.

The processor 551 may be any conventional processor, such as a commercially available CPU. The processor may also include, for example, a Graphic Process Unit (GPU), a Field Programmable Gate Array (FPGA), a System on Chip (SOC), an Application Specific Integrated Circuit (ASIC), or a combination of them.

The memory 552 may be implemented by any type or combination of volatile or non-volatile storage devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a Flash memory, a magnetic or optical disk.

In addition to the instructions 553, the memory 552 may also store data, such as the road maps, route information, location, direction, speed of the vehicle, and the like. The memory 552 stores data that may be used by the computing platform 550.

In an example of the disclosure, the processor 551 may execute the instructions 553 to perform all or part of the steps of the above-described braking control method.

In another example, there is also provided a computer program product including a computer program executable by a programmable apparatus, the computer program having a code portion for performing the braking control methods described herein when executed by the programmable apparatus.

Other embodiments of the disclosure will readily occur to those skilled in the art from consideration of the specification and practice of the disclosure. This application is intended to cover any variations, uses, or adaptations of the disclosure following the general principles of the disclosure and including common general knowledge or conventional techniques in the art that are not disclosed in the disclosure. The specification and examples are to be considered exemplary only and the true scope and spirit of the disclosure are indicated by the following claims.

It is understood that the disclosure is not limited to the precise structure that has been described herein and illustrated in the accompanying drawings, and that various modifications and changes may be made without departing from the scope of the appended claims. The scope of the disclosure is limited only by the appended claims.

The invention claimed is:

1. A method for braking control of a vehicle that is a four-wheeled vehicle, the method comprising:
   receiving, by a respective rim baking unit among a plurality of rim braking units in the vehicle, a control instruction from a central control unit to control a braking motor corresponding to the respective rim breaking unit, wherein the vehicle comprises a front axle motor, a first rear axle motor corresponding to a left rear wheel and a second rear axle motor corresponding to a right rear wheel, and two front wheels of the vehicle are each correspondingly provided with a rim braking unit from the plurality of rim braking units; and
   adjusting, in response to a braking state update instruction, at least one braking state of at least one of the braking motor or a target drive motor according to the braking state update instruction,
   wherein the target drive motor comprises at least one of: the front axle motor, the first rear axle motor or the second rear axle motor, and
   wherein the braking state update instruction comprises at least one of: a braking instruction, a vehicle tracking control triggering instruction, or a vehicle dynamic control triggering instruction;
   wherein adjusting, in response to the braking state update instruction, the at least one braking state according to the braking state update instruction comprises:
   in response to the braking instruction, in a case where a required braking force to which the braking instruction corresponds is determined to be greater than a preset threshold, controlling two braking motors to which the two front wheels respectively correspond to generate braking forces to satisfy the required braking force; and
   in a case where braking forces generated by the two braking motors fail to satisfy the required braking force, controlling the first rear axle motor and/or the second rear axle motor to generate a negative torque to achieve the required braking force.

2. The method according to claim 1, wherein adjusting, in response to the braking state update instruction, the at least one braking state according to the braking state update instruction, further comprises:

in response to the braking instruction, in a case where a required braking force to which the braking instruction corresponds is determined to be smaller than a preset threshold, according to an ideal braking force distribution curve, determining a first braking force and a second braking force, a sum of the first braking force and the second braking force being equal to the required braking force;

controlling two braking motors respectively corresponding to the two front wheels to generate the first braking force; and controlling the first rear axle motor and/or the second rear axle motor to generate the second braking force.

3. The method according to claim 1, wherein adjusting, in response to the braking state update instruction, the at least one braking state according to the braking state update instruction, further comprises:

determining, in response to the vehicle tracking control triggering instruction, a reference speed of the vehicle and a four-wheel slip rate according to wheel speeds of the two front wheels and axle speeds of the first rear axle motor and the second rear axle motor; and according to the reference speed of the vehicle and the four-wheel slip rate, adjusting at least one of braking forces generated by two braking motors respectively corresponding to the two front wheels to suppress front wheel slippage, or torque generated by at least one of the first rear axle motor or the second rear axle motor to suppress rear wheel slippage.

4. The method according to claim 1, wherein adjusting, in response to the braking state update instruction, the at least one braking state according to the braking state update instruction, further comprises:

in response to the vehicle dynamic control triggering instruction, determining a yaw angle of the vehicle, determining a reference speed of the vehicle, and a four-wheel slip rate according to wheel speeds of the two front wheels and axle speeds of the first rear axle motor and the second rear axle motor;

determining a braking torque required for each wheel based on the reference speed of the vehicle, the four-wheel slip rate, the yaw angle of the vehicle, and a target yaw velocity; and controlling two braking motors respectively corresponding to the two front wheels to generate braking forces to satisfy braking torques respectively corresponding to the two front wheels, and controlling at least one of the first rear axle motor or the second rear axle motor to generate negative torque to satisfy braking torques respectively corresponding to the left rear wheel and the right rear wheel.

5. The method according to claim 1, wherein the braking state update instruction further comprises a parking instruction; the rim braking unit is further connected with a parking mechanism, the rim braking unit is further configured to control the parking mechanism, the parking mechanism comprises a parking ratchet pawl, a reduction gear, and a parking solenoid valve or a parking motor;

adjusting, in response to the braking state update instruction, the at least one braking state according to the braking state update instruction, comprises:

determining, in response to the parking instruction, a required parking braking force based on vehicle weight and a hill angle;

controlling two braking motors corresponding to the two front wheels to generate braking forces to satisfy a parking braking force; and controlling the parking solenoid valve or the parking motor to clamp the parking ratchet pawl on the reduction gear to form a permanent parking force.

6. The method according to claim 1, wherein the central control unit comprises a main control unit and a redundant control unit, adjusting, in response to the braking state update instruction, the at least one braking state according to the braking state update instruction, comprises:

in a case where the main control unit is determined not to fail, adjusting, by the main control unit in response to a braking state update instruction, the at least one braking state of at least one of the braking motor or a target-driving motor according to the braking state update instruction; and in a case where the main control unit fails and the redundant control unit does not fail, adjusting, by the redundant control unit in response to the braking state update instruction, the at least one braking state of at least one of the braking motor or the target drive motor according to the braking state update instruction.

7. The method according to claim 1, wherein adjusting, in response to the braking state update instruction, the at least one braking state according to the braking state update instruction comprises:

determining a failure condition of the rim braking unit in response to the braking state update instruction; and adjusting the at least one braking state of at least one of the braking motor or the target drive motor according to the failure condition and the braking state update instruction.

8. A non-transitory computer-readable storage medium having computer program instructions stored thereon, wherein the computer program instructions, when executed by a processor, implement the steps of the method according to claim 1.

9. A chip, comprising a processor and an interface; wherein the processor is configured to read instructions to implement the method according to claim 1.

10. A braking control system, wherein the braking control system is arranged in a vehicle, the vehicle is a four-wheeled vehicle, the braking control system comprises:

a central control unit;

rim braking units;

braking motors;

a front axle motor; and a first rear axle motor corresponding to a left rear wheel and a second rear axle motor corresponding to a right rear wheel, wherein two front wheels of the vehicle are each correspondingly provided with one of the rim braking units and one or the braking motors, each of the rim braking units is configured to receive a control instruction from the central control unit to control a respective braking motor corresponding a respective rim braking unit that receives the control instruction, the central control unit is configured to adjust, in response to a braking state update instruction, at least one braking state of at least one of the braking motors or a target drive motor according to the braking state update instruction, the target drive motor comprises at least one of: the front axle motor, the first rear axle motor or the second rear axle motor, and the braking state update instruction comprises at least one of: a braking instruction, a vehicle tracking control triggering instruction, or a vehicle dynamic control triggering instruction;

wherein adjust, in response to the braking state update instruction, the at least one braking state according to the braking state update instruction comprises:

in response to the braking instruction, in a case where a required braking force to which the braking instruction corresponds is determined to be greater than a preset threshold, control two braking motors to which the two front wheels respectively correspond to generate braking forces to satisfy the required braking force; and in a case where braking forces generated by the two braking motors fail to satisfy the required braking force, control the first rear axle motor and/or the second rear axle motor to generate a negative torque to achieve the required braking force.

11. The braking control system according to claim 10, wherein adjust, in response to the braking state update instruction, braking state(s) of the respective braking motor and/or the target drive motor according to the braking state update instruction comprises:

in response to the braking instruction, in a case where a required braking force to which the braking instruction corresponds is determined to be greater than a preset threshold, preferentially controlling two braking motors to which the two front wheels respectively correspond to generate braking forces to satisfy the required braking force; and in a case where braking forces generated by the two braking motors fail to satisfy the required braking force, controlling the first rear axle motor and/or the second rear axle motor to generate a negative torque to complement the required braking force.

12. The braking control system according to claim 10, wherein adjust, in response to the braking state update instruction, braking state(s) of the respective braking motor and/or the target drive motor according to the braking state update instruction, further comprises:

in response to the braking instruction, in a case where a required braking force to which the braking instruction corresponds is determined to be smaller than a preset threshold, according to an ideal braking force distribution curve, determine a first braking force and a second braking force, a sum of the first braking force and the second braking force being equal to the required braking force;

control two braking motors respectively corresponding to the two front wheels to generate the first braking force; and control the first rear axle motor and/or the second rear axle motor to generate the second braking force.

13. The braking control system according to claim 10, wherein adjust, in response to the braking state update instruction, braking state(s) of the respective braking motor and/or the target drive motor according to the braking state update instruction, further comprises:

determine, in response to the vehicle tracking control triggering instruction, a reference speed of the vehicle and a four-wheel slip rate according to wheel speeds of the two front wheels and axle speeds of the first rear axle motor and the second rear axle motor; and according to the reference speed of the vehicle and the four-wheel slip rate, adjust braking forces generated by two braking motors respectively corresponding to the two front wheels to suppress front wheel slippage, and/or adjusting a torque(s) generated by the first rear axle motor and/or the second rear axle motor to suppress rear wheel slippage.

14. The braking control system according to claim 10, wherein adjust, in response to the braking state update instruction, a negative torque(s) to satisfy braking torques respectively corresponding to the left rear wheel and the right rear wheel.

15. The braking control system according to claim 10, wherein the braking state update instruction further comprises a parking instruction; each of the rim braking units is further connected with a parking mechanism, each of the rim braking units is further configured to control the parking mechanism, the parking mechanism comprises a parking ratchet pawl, a reduction gear, and a parking solenoid valve or a parking motor;

adjust, in response to the braking state update instruction, braking state(s) of the respective braking motor and/or the target drive motor according to the braking state update instruction, comprises:

determine, in response to the parking instruction, a required parking braking force based on vehicle weight and a hill angle;

control two braking motors corresponding to the front wheels to generate braking forces to satisfy a parking braking force; and control the parking solenoid valve or the parking motor to clamp the parking ratchet pawl on the reduction gear to form a permanent parking force.

16. The braking control system according to claim 10, wherein the central control unit comprises a main control unit and a redundant control unit, adjust, in response to the braking state update instruction, braking state(s) of the respective braking motor and/or the target drive motor according to the braking state update instruction, comprises:

in a case where the main control unit is determined not to fail, adjust, by the main control unit in response to a braking state update instruction, the braking state(s) of the respective braking motor and/or a target-driving motor according to the braking state update instruction; and in a case where the main control unit fails and the redundant control unit does not fail, adjust, by the redundant control unit in response to the braking state update instruction, the braking state(s) of the respective braking motor and/or the target drive motor according to the braking state update instruction.

17. A vehicle, comprising:

a processor; and a memory for storing processor-executable instructions, wherein the processor is configured to adjust, in response to a braking state update instruction, at least one braking state of at least one of a braking motor or a target drive motor according to the braking state update instruction, wherein the target drive motor comprises at least one of: a front axle motor, a first rear axle motor or a second rear axle motor, and the braking state update instruction comprises at least one of: a braking instruction, a vehicle tracking control triggering instruction, or a vehicle dynamic control triggering instruction;

wherein adjust, in response to the braking state update instruction, the at least one braking state according to the braking state update instruction comprises:

in response to the braking instruction, in a case where a required braking force to which the braking instruction corresponds is determined to be greater than a preset threshold, control two braking motors to which the two front wheels respectively correspond to generate braking forces to satisfy the required braking force; and in a case where braking forces generated by the two braking motors fail to satisfy the required braking force, control the first rear axle motor and/or the second rear axle motor to generate a negative torque to achieve the required braking force.

* * * * *